United States Patent [19]
Endo et al.

[11] Patent Number: 6,051,650
[45] Date of Patent: Apr. 18, 2000

[54] RUBBER-REINFORCED THERMOPLASTIC RESIN COMPOSITION CONTAINING PARTICLES OF GRAFT POLYMER

[75] Inventors: Shigeru Endo, Yokohama; Makiko Nagao; Toshinori Yamanaka, both of Kurashiki, all of Japan

[73] Assignee: Asahi Kasei Kogyo Kabushiki Kaisha, Osaka, Japan

[21] Appl. No.: 09/043,347

[22] PCT Filed: Sep. 22, 1995

[86] PCT No.: PCT/JP95/01920

§ 371 Date: Mar. 17, 1998

§ 102(e) Date: Mar. 17, 1998

[87] PCT Pub. No.: WO97/11127

PCT Pub. Date: Mar. 27, 1997

[51] Int. Cl.$^7$ .................................................. C08L 51/04
[52] U.S. Cl. ........................ 525/66; 525/71; 525/75; 525/191; 525/316; 525/322; 525/404
[58] Field of Search ................... 525/66, 71, 75, 525/191, 316, 404, 322

[56] References Cited

U.S. PATENT DOCUMENTS 5,283,286  2/1994  Takahashi et al. ...................... 525/310
5,332,854  7/1994  Yokota et al. ............................ 558/33

*Primary Examiner*—James J. Seidleck
*Assistant Examiner*—Olga Asinovsky
*Attorney, Agent, or Firm*—Pennie & Edmonds LLP

[57] ABSTRACT

A rubber-reinforced thermoplastic resin composition is disclosed. The rubber-reinforced thermoplastic resin composition comprises a thermoplastic resin matrix having dispersed therein particles of a graft polymer, the particles of a graft polymer comprising particles of a rubber polymer having emulsion-graft-polymerized to the surface thereof two or more kinds of vinyl compounds copolymirizable with the rubber polymer, wherein the surface graft coverage of the vinyl compounds graft-polymerized to the surface of the particles of a rubber polymer as determined by equation (m1) is 80% or more and the average thickness of the vinyl compounds graft-polymerized to the surface of the particles of a rubber polymer is from 5 to 25 nm:

$$\text{Surface graft coverage (\%)} = (s2/s1) \times 100 \qquad (m1)$$

wherein $s1$ represents the surface area of the particles of a rubber polymer; and $s2$ represents the surface area of the vinyl compound graft-polymerized to the surface of the particles of a rubber polymer so as to cover the surface of the particles of a rubber polymer.

12 Claims, 2 Drawing Sheets

6,051,650

RUBBER-REINFORCED THERMOPLASTIC RESIN COMPOSITION CONTAINING PARTICLES OF GRAFT POLYMER

TECHNICAL FIELD

The present invention relates to a rubber-reinforced thermoplastic resin composition excellent in impact resistance, fluidity during high-temperature processing, resistance to coloration during high-temperature retention, impact resistance during high-temperature retention, and resistance to gelation during high-temperature retention.

BACKGROUND ART

Heretofore, rubber-reinforced thermoplastic resin compositions such as an ABS resin have been widely used as general-purpose resins having well-balanced impact resistance, moldability, surface gloss and other mechanical properties and materials usable as a substitute of engineering plastics.

For such a rubber-reinforced thermoplastic resin composition, impact resistance, moldability and other mechanical properties under ordinary conditions as well as these physical properties during high-temperature processing or high-temperature retention, i.e., thermal stability, are very important. When rubber-reinforced thermoplastic resin compositions are extrusion-granulated or molded, deterioration by heat generated by shear or heat retention can often occur, such as decrease in impact resistance of a molded product, yellowing of resin, and deterioration of surface gloss. Further, when heat retention proceeds, a gel-like material is produced in the extruder or molding machine and incorporated in the molded product as a contaminant in the resin, causing problems. Moreover, when a large-sized product is molded or a product having a complicated shape or small thickness is molded, the resin is often molded at a high temperature so that it can be easily extended all over the interior of the mold. In this case, problems often arise such as decrease in impact resistance, fluidity and surface gloss.

Further, the foregoing decrease in fluidity during high-temperature processing, decrease in impact resistance during high-temperature retention, coloration during high-temperature retention, and gelation during high-temperature retention remarkably appear when particles of a rubber polymer having a large particle diameter designed to have an excellent impact resistance under ordinary extrusion molding conditions are used or when particles of a rubber polymer having a low gel fraction content are used. Therefore, it has been difficult to obtain a rubber-reinforced thermoplastic resin composition excellent in impact resistance under ordinary extrusion molding conditions, fluidity during high-temperature processing, impact resistance during high-temperature retention, resistance to coloration during high-temperature retention, and resistance to gelation during high-temperature retention, when the particles of a rubber polymer have a large particle diameter or a low gel fraction content.

In order to solve these problems, there has been proposed to reduce the added amount of the rubber polymer or to increase the gel fraction content of the rubber polymer. However, these approaches are undesirable in the design attaining high impact resistance.

Alternatively, there has been proposed to increase the percent graft amount of a vinyl compound graft-polymerized to the particles of a rubber polymer shown by the following equation:

$$\text{Percent graft amount (\%)} = \frac{\text{amount of vinyl compound grafted}}{\text{amount of rubber polymer}} \times 100$$

This approach can maintain surface gloss at high temperatures but disadvantageously causes decrease in impact resistance or fluidity at ordinary molding temperature.

Further, there has been proposed to employ an approach which comprises adding various oxidation inhibitors during extrusion or molding to inhibit the coloration or decrease in impact resistance due to heat deterioration. However, this approach cannot always inhibit the decrease in impact resistance or fluidity at high temperatures or the decrease in impact resistance during high-temperature retention. For the design attaining good impact resistance and surface gloss, U.S. Pat. No. 4,009,227 employs a combination of particles of rubber having a middle to large particle diameter with particles of a rubber polymer having a small particle diameter. However, this approach requires a complicated preparation process which comprises separate graft polymerization steps of particles of rubber having a large particle diameter and the particles of rubber having a small particle diameter, followed by mixing.

JP-A-62-164707 (The term "JP-A" as used herein means an "unexamined published Japanese patent application") discloses a thermoplastic resin composition excellent in impact resistance and surface gloss at high temperatures containing particles of rubber having a vinyl compound grafted thereon to an average thickness of from 10 to 20 nm. However, the graft polymerization of a vinyl compound on particles of a rubber polymer generally features that the greater the particle diameter of the rubber polymer is, or the lower the gel fraction content of the rubber polymer is, the more difficultly can be graft-polymerized on the surface of the rubber polymer the vinyl compound. Further, the present inventors have found that in the case where the particles of a rubber polymer has a low gel fraction content, and in the case where, even if the gel fraction content of particles of a rubber polymer is close to 100%, when the particles have a large particle diameter exceeding 250 nm, the thickness of the vinyl compound graft-polymerized on the surface of the particles of a rubber polymer can be easily uneven, making it difficult to balance the impact resistance with the surface gloss at high temperatures only by controlling the average thickness of the vinyl compound graft-polymerized on the particles of a rubber polymer. JP-A-62-164707 also does not refer to fluidity at high temperatures, coloration during high-temperature retention, impact resistance during high-temperature retention, and resistance to gelation during high-temperature retention.

Therefore, a rubber-reinforced thermoplastic resin composition has been hardly provided that is excellent in impact resistance under ordinary extrusion molding conditions, in fluidity during high-temperature processing, impact resistance during high-temperature retention, resistance to coloration during high-temperature retention, on conditions that the particles of a rubber polymer have a large particle diameter and a low gel fraction content, to have an excellent impact resistance under ordinary extrusion molding conditions.

DISCLOSURE OF THE INVENTION

It is therefore an object of the present invention to provide a rubber-reinforced thermoplastic resin composition excellent in impact resistance under ordinary extrusion molding conditions, as well as in fluidity during high-temperature processing, and impact resistance, resistance to coloration and resistance to gelation during retention even when the particles of a rubber polymer have a large particle diameter and a low gel fraction content.

The inventors made extensive studies on the foregoing problems. As a result, it has been found that the surface area of the rubber polymer covered by the graft-polymerized polymer, i.e., the surface graft coverage, and the average thickness of the layer of the graft-polymerized polymer (graft layer) are important in the graft polymerization of two or more kinds of vinyl compounds on the surface of the rubber polymer. It has been also found that when the surface graft coverage can be raised to not less than 80%, desirable physical properties can be obtained even if the average thickness of the graft layer is not more than 10 nm. It has been further found that when at least one of emulsifying agent to be used for the emulsion graft polymerization is an emulsifying agent having radically polymerizable double bonds in its molecule, it can exert an excellent effect of solving the foregoing problems. Thus, the present invention has been worked out.

The present invention relates to a rubber-reinforced thermoplastic resin composition comprising a thermoplastic resin matrix dispersed therein particles of a graft polymer, the particles of a graft polymer comprising particles of a rubber polymer having emulsion-graft-polymerized to the surface thereof two or more kinds of vinyl compounds graft-copolymerizable with the rubber polymer, wherein the surface graft coverage of the vinyl compounds graft-polymerized to the surface of the particles of a rubber polymer as determined by equation (m1) is 80% or more and the average thickness of the vinyl compounds graft-polymerized to the surface of the particles of a rubber polymer is from 5 to 25 nm:

Surface graft coverage (%)=($s2/s1$)×100  (m1)

wherein s1 represents the surface area of the particles of a rubber polymer; and s2 represents the surface area of the vinyl-compound graft-polymerized to the surface of the particles of a rubber polymer so as to cover the surface of the particles of a rubber polymer.

BEST MODE FOR PRACTICING INVENTION

The percent surface graft coverage as used herein is defined by the following equation (m1) assuming that s1 is the surface area of the particles of the rubber polymer (rubber polymer particles) and s2 is the surface area of the vinyl compound grafted on the surface of the rubber polymer particles such that it covers the surface of the rubber polymer particles. Accordingly, the percent surface graft coverage is a measure of how extent the surface of rubber polymer particles dispersed in the rubber-reinforced thermoplastic resin composition is grafted with and covered by the graft polymer of the vinyl compound. When the rubber polymer particles are thoroughly covered by the graft polymer, the percent surface graft coverage is 100%.

Surface graft coverage (%)=($s2/s1$)×100  (m1)

Figure 1:
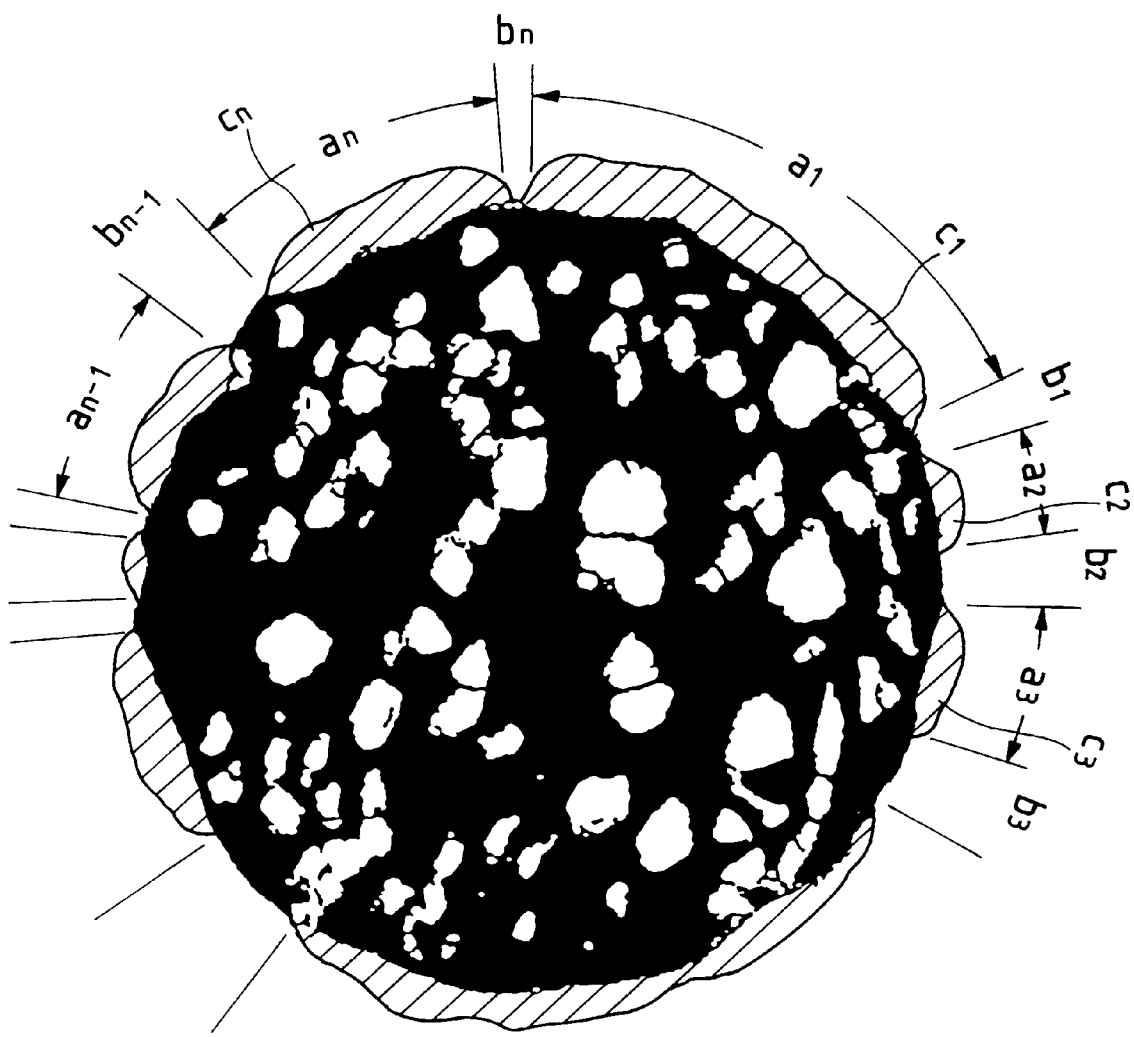
FIG. 1 illustrates a specific example of analysis for determining the percent surface graft coverage and the covered thickness of vinyl compound of the present invention. Numeral 1 denotes a rubber polymer and 2 denotes a vinyl compound graft-polymerized on the rubber polymer. The portions $a_1$ to $a_n$ indicate the peripheral length of the portion on the particles of the rubber polymer that is covered by the vinyl compound. The portion $b_1$ to $b_n$ indicate the peripheral length of the portion on the particles of the rubber polymer that is not covered by the vinyl compound. The portions $c_1$ to $c_n$ indicate the area of the vinyl compound.

As described later, the percent surface graft coverage can be determined by analyzing and measuring an electron micrograph of an extremely thin section of a graft polymer particle dispersed in the rubber-reinforced thermoplastic resin composition. FIG. 1 schematically illustrates the electron micrograph. Specifically, the lengths $a_1$ to $a_n$ and $b_1$ to $b_n$ are measured, and from these measurements, r1 and r2 represented by the following equation are then determined.

$r1 = (a_1 + a_2 + \ldots + a_{n-1} + a_n) + (b_1 + b_2 + \ldots + b_{n-1} + b_n)$ $r2 = a_1 + a_2 + \ldots + a_{n-1} + a_n$ Assuming that r1 is the length corresponding to the surface area of the rubber polymer particles and r2 is the length corresponding to the surface area of the vinyl compound grafted on the surface of the rubber polymer particles such that it covers the surface of the rubber polymer particles. The percent surface graft coverage can be determined by the following equation (m1'):

Surface graft coverage (%)=($r2/r1$)×100  (m1')

In the present invention, the percent surface graft coverage is 80% or more, preferably 90% or more. The closer to 100%, i.e., upper limit, the percent surface graft coverage is, the more preferred is it.

If the percent surface graft coverage falls below 80%, it can often reduce the impact resistance of the composition. Even if there is no decrease in the impact resistance of the composition, it disadvantageously causes decrease in fluidity during high-temperature processing, coloration by heat deterioration and production of a gel-like material by retention during extrusion or molding.

Figure 2:
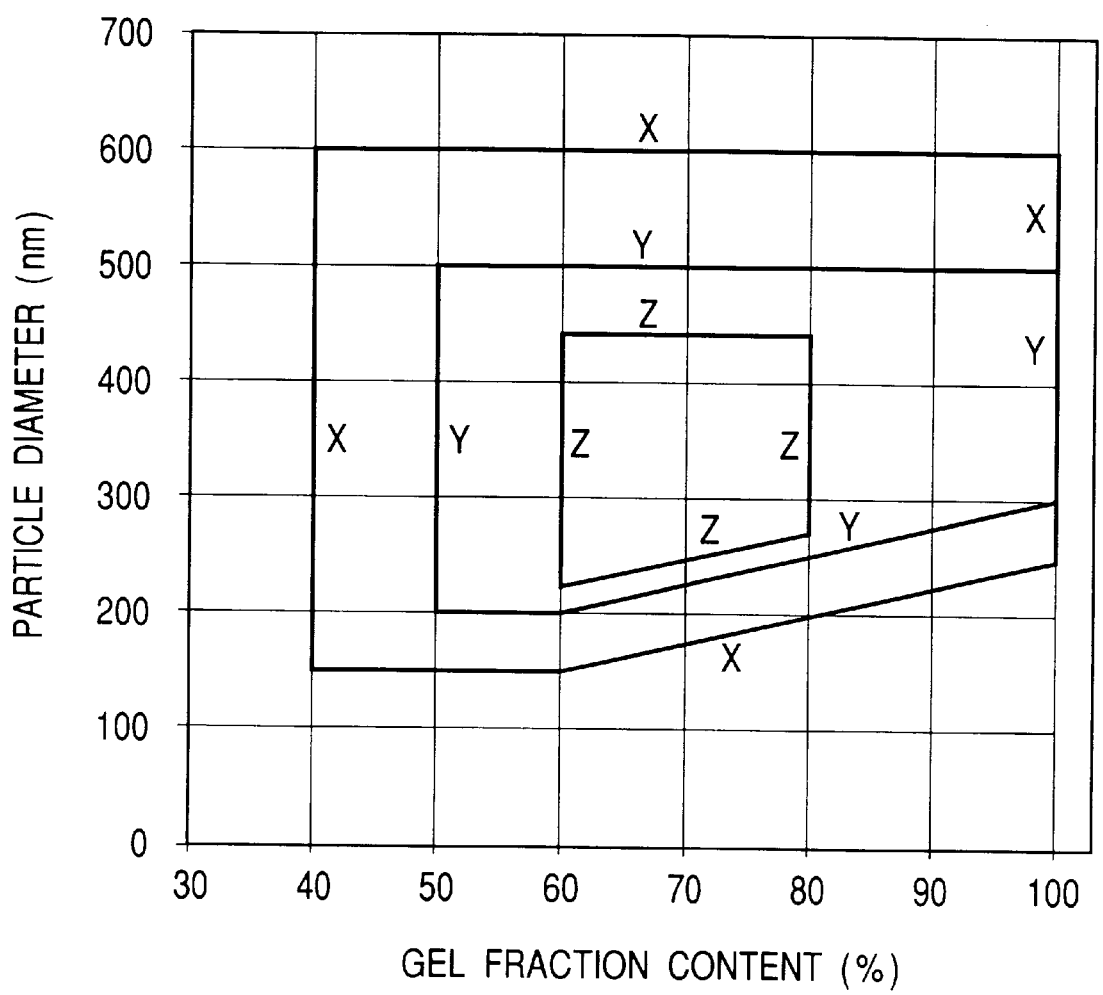
FIG. 2 illustrates the relationship between the gel fraction content X % and the weight-average particle diameter Y nm of the present invention.

Further, a rubber-reinforced thermoplastic resin composition which is more excellent in impact resistance, fluidity during high-temperature processing, impact resistance during retention, resistance to coloration during retention and resistance to gelation during retention can be obtained when the percent surface graft coverage is not less than 80% in the region where the weight-average particle diameter (Y nm) of the rubber polymer particles contained in the thermoplastic resin composition and its gel fraction content (X %) satisfy the conditions represented by the following relationships (m2) and (m3) (region surrounded by the straight lines X in FIG. 2), preferably the following equations (m4) and (m5) (region surrounded by the straight line Y in FIG. 2), more preferably the following equation (m6) (region surrounded by the straight line Z in FIG. 2).

$40 \leq X \leq 60$, and $150 \leq Y \leq 600$  (m2)

$60 \leq X \leq 100$, and $2.5 \leq Y \leq 600$  (m3)

$50 \leq X \leq 60$, and $200 \leq Y \leq 500$  (m4)

$60 \leq X \leq 100$, and $2.5X + 50 \leq Y \leq 600$  (m5)

$60 \leq x \leq 80$, and $2.5X + 75 \leq Y \leq 450$  (m6)

The average thickness of the vinyl compound grafted on the surface of the rubber polymer particles is preferably from 5 to 25 nm, more preferably from 7 to 15 nm, in the region where the percent surface graft coverage is not less than 80%. If the average thickness of the vinyl compound grafted on the surface of the rubber polymer particles falls below 5 nm, it tends to cause decrease in surface gloss during high-temperature processing or gelation during retention. If the average thickness of the vinyl compound grafted on the surface of the rubber polymer particles exceeds 25 nm, it tends to cause decrease in fluidity.

The constitution of the rubber-reinforced thermoplastic resin composition of the present invention and the process for the preparation thereof will be described hereinafter.

Examples of the rubber polymer employable in the present invention include conjugated diene rubber such as polybutadiene, polyisoprene, polychloroprene, butadiene-styrene copolymers and butadiene-acrylonitrile copolymers; and acrylic rubber such as ethylene-propylene rubber, polyethyl acrylate, and polybutyl acrylate. Preferred among these rubber polymers are conjugated diene rubber such as polybutadiene, butadiene-styrene copolymers and butadiene-acrylonitrile copolymers. Two or more of these rubber polymers may be used in combination.

The content of the rubber polymer in the rubber-reinforced thermoplastic resin composition is preferably from 5 to 60% by weight, more preferably from 10 to 50% by weight, based on the mount of the resin composition. In this region, better impact resistance, fluidity during molding and gloss can be provided.

A preferred particle diameter of the rubber polymer particles in the rubber-reinforced thermoplastic resin composition varies depending on the kind of the thermoplastic resin as a matrix and is not specifically limited. When the thermoplastic resin composition is an ABS resin, the particle diameter is preferably from 150 to 600 nm, more preferably from 200 to 500 nm, particularly preferably from 250 to 450 nm. The particle diameter preferably falls within the above specified range in the light of impact resistance and gloss.

Examples of the vinyl compound graft-polymerizable with the rubber polymer particles employable in the present invention include (a1) aromatic vinyl compounds such as styrene and main chain- or side chain-substituted styrene such as α-methylstyrene, (a2) vinyl cyanide compounds such as acrylonitrile and methacrylonitrile, (a3) acrylic esters such as methyl acrylate, ethyl acrylate and butyl acrylate, and methacrylic esters such as methyl methacrylate, (a4) acrylic acids such as acrylic acid and methacrylic acid, (a5) maleimide monomers such as N-phenylmaleimide and N-methylmaleimide, and (a6) glycidyl group-containing monomers such as glycidyl methacrylate. These vinyl compounds may be used in combination. Particularly preferred among these is a combination of two or more monomers including an aromatic vinyl compound and a vinyl cyanide compound.

The relative amount of the vinyl compound graft-polymerized on the rubber polymer particles, i.e., graft ratio, is represented by the ratio obtained by dividing the weight of the graft polymer particles by the weight of the original rubber polymer particles. The graft ratio is preferably from 20% to 200% in the light of impact resistance and fluidity, more preferably from 20% to 80%.

As the thermoplastic resin used as the matrix, a polymer or copolymer of the foregoing monomers listed as the vinyl compounds graft-polymerizable with the rubber polymer particles are generally used. Specific examples of such a thermoplastic resin include acrylonitrile-styrene copolymers, acrylonitrile-styrene-α-methylstyrene copolymers, acrylonitrile-styrene-phenylmaleimide copolymers, and methyl methacrylate-styrene-acrylonitrile copolymers. Preferred among these thermoplastic resins is a thermoplastic resin containing at least one kind of an aromatic vinyl compound and a vinyl cyanide compound.

The thermoplastic resin may be produced as a polymer or copolymer which is not grafted in the graft polymerization process, or alternatively, it may be polymerized in a separate process and then blended in the composition. The amount of the thermoplastic resin can be determined by subtracting the total weight of the rubber polymer and the grafted polymer or copolymer from the total weight of the rubber-reinforced thermoplastic resin composition.

The rubber-reinforced thermoplastic resin composition of the present invention may be used in admixture with other thermoplastic resins than the above. Examples of the other thermoplastic resins include polycarbonate, polyphenylene oxide, acrylic resin, thermoplastic polyurethane, polyester, and polyamide. The amount of other thermoplastic resins may be from 1 to 70% by weight based on the total amount of the resin composition, and the amount of the rubber-reinforced thermoplastic resin composition may be from 30 to 99% by weight based on the total amount of the resin composition. In this amount range, a higher impact resistance and excellent moldability at high temperatures, which are the effect of the present invention, can be enhanced.

The process for the preparation of the rubber-reinforced thermoplastic resin composition of the present invention is not specifically limited. In general, an emulsion graft polymerization process may be employed which comprises allowing a vinyl compound to be graft-polymerized with a rubber polymer latex which has been produced by emulsion polymerization. The emulsion graft polymerization process may be effected in a continuous process, a batch process, or a semi-batch process. An alternate process may be employed which comprises preparing a high rubber content graft polymer by the foregoing process, and then mixing therewith a thermoplastic resin comprising, as a main component, a vinyl compound used in the graft polymerization prepared by mass polymerization, emulsion polymerization or suspension polymerization, so as to obtain a desired rubber content.

In the present invention, an emulsion graft polymerization process is preferably employed, which comprises continuously adding, to rubber polymer particles which has been produced by emulsion polymerization, a vinyl compound together with a polymerization initiator, a molecular weight adjustor, etc. In particular, if the rubber polymer particles have a large particle diameter and a low gel fraction content, on which a vinyl compound can inherently be hardly grafted, it is important to use a specific emulsifying agent in the graft polymerization to raise the surface graft coverage to not less than 80%. In other words, it is important to use as such an emulsifying agent, an emulsifying agent containing a polymerizable double bond in its molecule (hereinafter referred to as "polymerizable emulsifying agent"). The polymerizable emulsifying agent is a compound having both a hydrophilic group and a hydrophobic group capable of lowering the gas-liquid, liquid-liquid, and solid-liquid interfacial tension that contains one or more double bonds polymerizable with a conjugated diene rubber, an aromatic vinyl compound, a vinyl cyanide compound and/or a (meth) acrylic ester compound. The hydrophilic group contained in the polymerizable emulsifying agent may be of anionic, nonionic or cationic nature, preferably anionic nature, more preferably both nonionic nature and anionic nature.

The amount of the polymerizable emulsifying agent to be used is preferably from 1 to 15 parts by weight per 100 parts by weight of the rubber polymer particles. In this range, the graft polymerization can be conducted with a higher stability and the resulting rubber-reinforced thermoplastic resin composition can be provided with a higher water resistance.

In the emulsion graft polymerization, the polymerizable emulsifying agent may be used in combination with a non-polymerizable emulsifying agent. The amount of the non-polymerizable emulsifying agent to be used is not more than 4.0 parts by weight based on 100 parts by weight of the rubber polymer particles. The non-polymerizable emulsifying agent may be an emulsifying agent commonly used for emulsion polymerization. Specific examples of such an emulsifying agent include anionic emulsifying agents such as a rhodinic acid salt, a higher aliphatic acid salt, an alkylsulfuric acid ester, an alkylbenzenesulfonic acid salt, an alkyldiphenyl ether disulfonate, polyoxyethylene alkyl phenyl ether sulfate, and dialkylsulfosuccinate; and nonionic emulsifying agents such as a polyoxyethylene alkyl ether and a polyoxyethylene alkyl phenyl ether.

Examples of the polymerizable emulsifying agent employable in the present invention will be given below, but the present invention is not limited thereto.

Polymerizable emulsifying agents represented by formula (1):

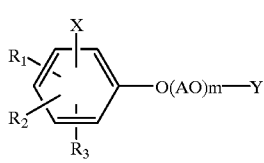

(1)

wherein

X represents an allyl group, a methylallyl group, an acryloyl group, a methacryloyl group, a vinyl group, a 1-propenyl group, or an isopropenyl group;

Y represents a hydrogen atom, a sulfate group represented by —$SO_3M$ (in which M represents a hydrogen atom, an alkaline earth, an alkaline earth metal, an ammonium, or a hydroxylalkylammonium having from 1 to 4 carbon atoms), a carboxylate group represented by —$CH_2COOM$ (in which M represents a hydrogen atom, alkaline earth, alkaline earth metal, ammonium, or a hydroxylalkylammonium having from 1 to 4 carbon atoms), or a monoester phosphate group represented by formula (1'):

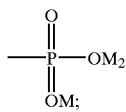

(1')

wherein $M_1$ and $M_2$ may be the same or different and each represent a hydrogen atom, an alkaline metal, an alkaline earth metal, a ammonium, or a hydroxyalkylammonium having from 1 to 4 carbon atoms;

$R_1$ represents a alkyl group having from 1 to 18 carbon atoms, an alkenyl group, or an aralkyl group;

$R_2$ represents a hydrogen atom, an alkyl group having from 1 to 18 carbon atoms, an alkenyl group, or an aralkyl group;

$R_3$ represents a hydrogen atom or a propenyl group;

A represents a alkylene group having from 2 to 4 carbon atoms or an alkylene group having from 2 to 4 carbon atoms and having a substituent; and m represents an integer of from 1 to 200.

The polymerizable emulsifying agents represented by formula (1) are described in U.S. Pat. No. 5,332,854. Specific examples of the polymerizable emulsifying agents represented by formula (1) include compounds represented by formulae (5) to (8):

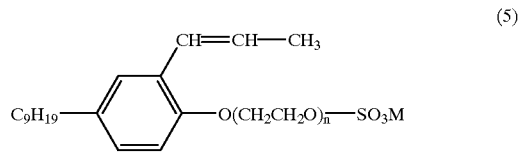

(5)

wherein M represents an alkaline metal, an alkaline earth metal, an ammonium, or a $C_{1-4}$ hydroxyalkylammonium; and n represents an integer of from 1 to 100 (the expression "$C_{1-4}$" and the like used herein means "having from 1 to 4 carbon atoms" and the like);

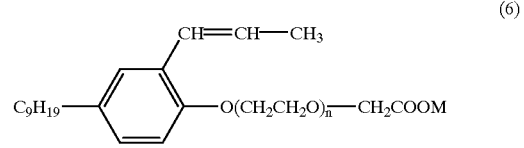

(6)

wherein M represents an alkaline metal or an alkaline earth metal; and n represents an integer of from 1 to 100;

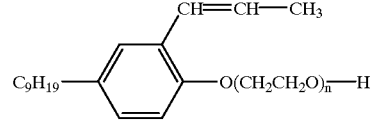

(7)

wherein n represents an integer of from 10 to 200; and

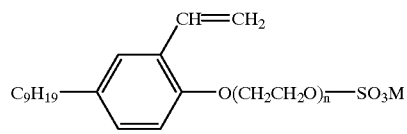

(8)

wherein M represents an alkaline metal, an alkaline earth metal, an ammonium, or a $C_{1-4}$ hydroxyalkylammonium; and n represents an integer of from 1 to 100.

(Meth)allylglycidylether derivatives and (meth)acrylglycidylester derivatives represented by formula (2) (the expression "(meth)acryl" and the like used herein means "acryl and methacryl" and the like):

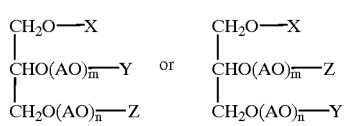

(2)

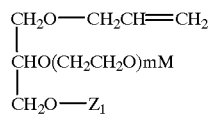

wherein

X represents an allyl group, a methylallyl group, an acryloyl group, a methacryloyl group, a vinyl group, a 1-propenyl group, or an isopropenyl group;

Y represents a hydrogen atom, a sulfate group represented by $-SO_3M$ (in which M represents a hydrogen atom, an alkaline earth, an alkaline earth metal, an ammonium, or a hydroxylalkylammonium having from 1 to 4 carbon atoms), a carboxylate represented by $-CH_2COOM$ (in which M represents a hydrogen atom, an alkaline earth, an alkaline earth metal, an ammonium, or a hydroxylalkylammonium having from 1 to 4 carbon atoms), a monoester phosphate group represented by formula (1') above, or a group represented by formula (1''):

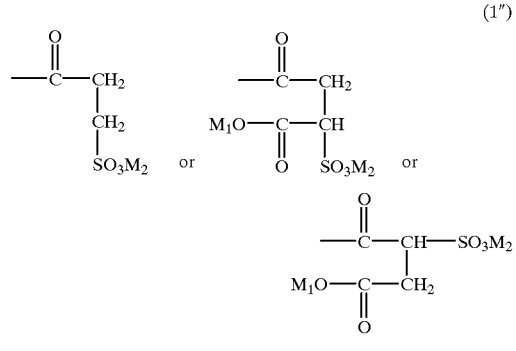

(1'')

wherein $M_1$ represents a hydrogen atom, an alkaline metal, an alkaline earth metal, an ammonium, a hydroxyalkylammonium having from 1 to 4 carbon atoms, or an alkyl group having from 8 to 30 carbon atoms which may contain an alkylene oxide group having from 2 to 4 carbon atoms; and $M_2$ represents a hydrogen atom, an alkaline metal, an alkaline earth metal, an ammonium, or a hydroxyalkylammonium having from 1 to 4 carbon atoms;

Z represents a alkyl group having from 8 to 30 carbon atoms, a substituted alkyl group such as hydroxyalkyl group, an alkenyl group, a substituted alkenyl group such as a hydroxyalkenyl group, an alkylaryl group, a substituted alkylaryl group such as a hydroxyalkylaryl group, an aralkyl aryl group, a substituted aralkyl aryl group such as a hydroxyaralkyl aryl group, an acyl group, or a substituted acyl group such as a hydoxyacyl group;

A represents a alkylene group having from 2 to 4 carbon atoms or a substituted alkylene group;

m represents an integer of from 0 to 100; and n represents an integer of from 0 to 50.

Preferred examples of the compounds represented by formula (2) include those represented by formulae (9) to (15):

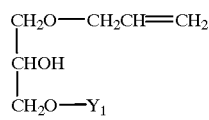

(9)

wherein M represents a hydrogen atom or a group $-SO_3M_1$ (in which $M_1$ represents an alkaline metal, an alkaline earth metal, an ammonium, or a $C_{1-4}$ hydroxyalkylammonium); $Z_1$ represents a $C_{8-30}$ alkyl group or an alkylaryl group; and m represents an integer of from 0 to 100;

(10)

$$\begin{array}{c} CH_2O-CH_2CH=CH_2 \\ | \\ CHO(CH_2CH_2O)mCH_2COOM \\ | \\ CH_2O-Z_1 \end{array}$$

wherein M represents an alkaline metal or an alkaline earth metal; $Z_1$ represents a $C_{8-30}$ alkyl group or an alkylaryl group; and m represents an integer of from 0 to 100;

(11)

$$\begin{array}{c} CH_2O-CH_2CH=CH_2 \\ | \\ CHOH \\ | \\ CH_2O-Y_1 \end{array}$$

wherein $Y_1$ represents a group represented by formula (11'):

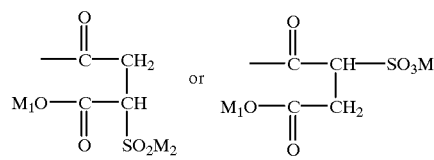

(11')

wherein $M_1$ represents a $C_{8-30}$ alkyl group which may contain a $C_{2-4}$ alkylene oxide group; and $M_2$ represents an alkaline metal, an alkaline earth metal, an ammonium, or a $C_{1-4}$ hydroxyalkylammonium;

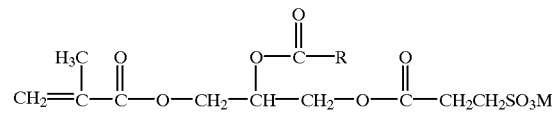

(12)

wherein R represents a $C_{4-30}$ alkyl group which may contain substituents such as a hydroxyalkyl group; and M represents an alkaline metal, an alkaline earth metal, an ammonium, or a $C_{1-4}$ hydroxyalkylammonium;

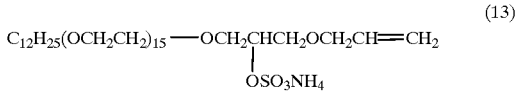

(13)

-continued

(14)
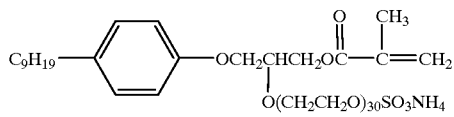

(15)
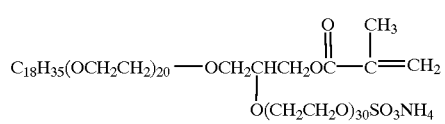

Succinic acid derivatives represented by formula (3):

(3)
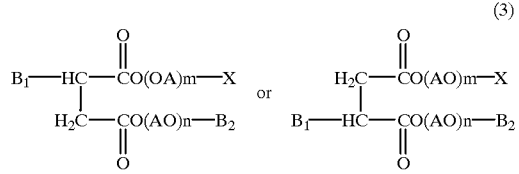

wherein

X represents an allyl group, a methylallyl group, an acryloyl group, a methacryloyl group, a vinyl group, a 1-propenyl group, or an isopropenyl group;

$B_1$ and $B_2$ are different from each other and each represent Y or Z, wherein Y represents M or $-SO_3M$ in which M represents a hydrogen atom, an alkaline metal, an alkaline earth metal, an ammonium, or a hydroxyalkylammonium having from 1 to 4 carbon atoms, and Z represents a alkyl group having from 8 to 30 carbon atoms or an alkenyl group;

A represents a alkylene group having from 2 to 4 carbon atoms or an alkylene group having substituents; and m and n may be the same or different and each represent an integer of from 0 to 50.

Specific preferred examples of the compound represented by formula (3) include compounds represented by formulae (16) to (19):

(16)
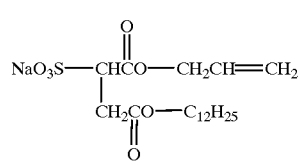

(17)
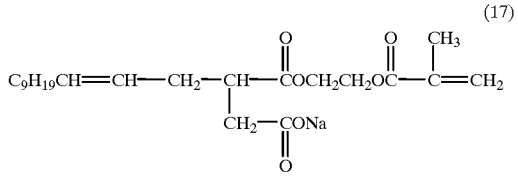

(18)

$$C_{13}H_{27}CH=CH-CH_2-\underset{\underset{O}{\overset{\|}{CH_2-CONa}}}{CH}-CO-(CH_2CH_2O)_6-\overset{O}{\overset{\|}{C}}-\overset{CH_3}{\overset{|}{C}}=CH_2$$

(19)

$$C_{13}H_{27}CH=CH-CH_2-\underset{\underset{O}{\overset{\|}{CH_2-CONa}}}{CH}-CO-(CH_2CH_2O)_6-CH_2-C=CH_2$$

Compounds represented by formula (4):

(4)
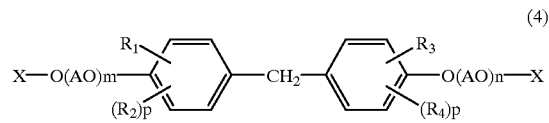

wherein

X represents an allyl group, a methylallyl group, an acryloyl group, a methacryloyl group, a vinyl group, a 1-propenyl group, or an isopropenyl group;

Y represents a hydrogen atom, a sulfate group represented by $-SO_3M$ (in which M represents a hydrogen atom, an alkaline earth, an alkaline earth metal, a ammonium or a hydroxylalkylammonium having from 1 to 4 carbon atoms), or a carboxylate group represented by $-CH_2COOM$ (in which M represents a hydrogen atom, an alkaline earth, an alkaline earth metal, an ammonium, or a hydroxylalkylammonium having from 1 to 4 carbon atoms);

$R_1$ and $R_3$ may be the same or different and each represent a hydrogen atom, an alkyl group having from 1 to 25 carbon atoms;

$R_2$ and $R_4$ may be the same or different and each represent an alkyl group having from 1 to 25 carbon atoms, a benzyl group, or a styryl group;

p represents an integer of from 0 to 2;

A represents an alkylene group having from 2 to 4 carbon atoms or an alkylene group having a substituent; and n and m may be the same or different and each represent an integer of from 0 to 50.

Specific preferred examples of the compound represented by formula (4) include compounds represented by formulae (20) and (21):

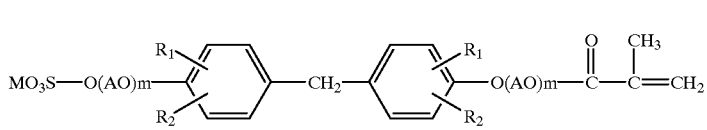
(20)

wherein M represents a hydrogen atom or an alkaline metal; and

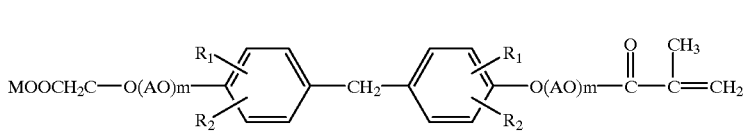
(21)

wherein M represents a hydrogen atom or an alkaline metal.

(Meth)allylether derivatives and (meth)allylester derivatives represented by formula (22):

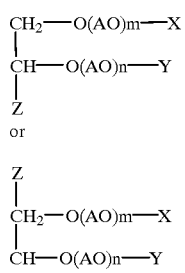
(22)

wherein

X represents an allyl group, a methylallyl group, an acryloyl group, a methacryloyl group, a vinyl group, a 1-propenyl group, or an isopropenyl group;

Y represents a hydrogen atom, a methyl group, a sulfuric ester group represented by $-SO_3M$ (in which M represents a hydrogen atom, an alkaline metal, an alkaline earth metal, an ammonium, or a $C_{1-4}$ hydroxyalkylammonium), a carboxylate group represented by $-CH_2COOM$ (in which M represents a hydrogen atom, an alkaline metal, an alkaline earth metal, an ammonium, or a $C_{1-4}$ hydroxyalkylammonium), or a phosphoric monoester represented by formula (1') above;

Z represents a $C_{8-30}$ alkyl group;

A represents a $C_{2-4}$ alkylene group or a substituted alkylene group;

m represents an integer of from 0 to 20; and n represents an integer of from 0 to 50.

Specific preferred examples of the compound represented by formula (22) include compounds represented by formulae (23) and (24):

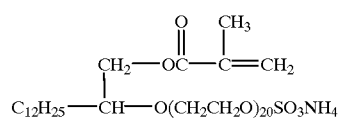
(23)

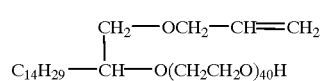
(24)

Diol compounds represented by formula (25):

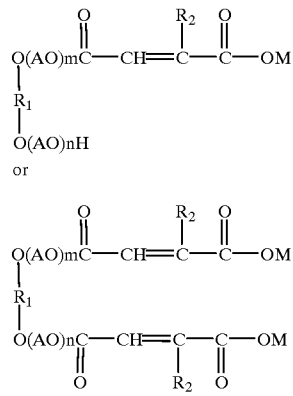
(25)

wherein

A represents a $C_{2-4}$ alkylene group;

$R_1$ represents a $C_{8-24}$ hydrocarbon group;

$R_2$ represents a hydrogen atom or a methyl group;

m and n each may be the same or different and each represent a number of from 0 to 100, with the proviso that the sum of m and n is from 0 to 100; and M represents a hydrogen atom, an alkaline metal, an alkaline earth metal, an ammonium, or a $C_{1-4}$ hydroxyalkylammonium.

Specific preferred examples of the diol compound represented by formula (25) include compounds represented by formula (26):

(26)

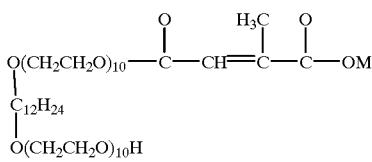

Compounds represented by formula (27):

$$X-Z-Y \text{ or } X-Z-O(AO)_n-Y \quad (27)$$

wherein
X represents an allyl group, a methylallyl group, an acryloyl group, a methacryloyl group, a vinyl group, a 1-propenyl group, an isopropenyl group, an allyloxy group, a methallyloxy group, an acryloyloxy group, a methacryloyloxy group, or a compound represented by formula (27'):

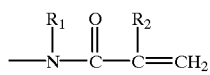

(27')

wherein
$R_1$ and $R_2$ each represent a hydrogen atom or a methyl group;
Y represents a hydrogen atom, a sulfate group represented by —$SO_3M$ (in which M represents a hydrogen atom, an alkaline earth, an alkaline earth metal, an ammonium, or a $C_{1-4}$ hydroxylalkylmmonium), an carboxylate group represented by —$CH_2COOM$ (in which M represents a hydrogen atom, an alkaline earth, an alkaline earth metal, an ammonium or a $C_{1-4}$ hydroxylalkylammonium), a monoester phosphate represented by formula (1') above, or a compound represented by formula (1") above;
Z represents a $C_{6-30}$ alkylene group;
A represents a $C_{2-4}$ alkylene group or a substituted alkylene group; and
m and n each may the same or different and each represent an integer of from 0 to 50.

Specific preferred examples of the compound represented by formula (27) include compounds represented by formulae (28) to (30):

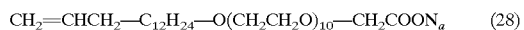

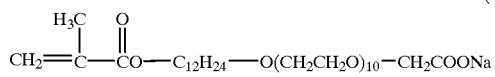

Preferred among these polymerizable emulsifying agents are those represented by formulae (1), (2), (3), and (4). Particularly preferred among these polymerizable emulsifying agents are those represented by formula (1).

Preferred among the polymerizable emulsifying agents represented by formula (2) are those represented by formulae (9) and (11). Specific preferred examples of the polymerizable emulsifying agent represented by formula (9) include those represented by formulae (31) to (34). Specific preferred examples of the polymerizable emulsifying agent represented by formula (11) include those represented by formulae (35) and (36):

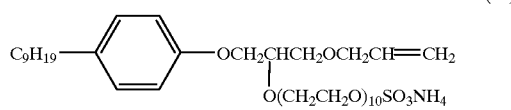

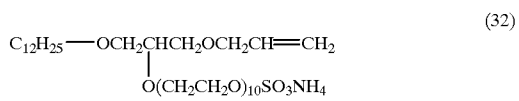

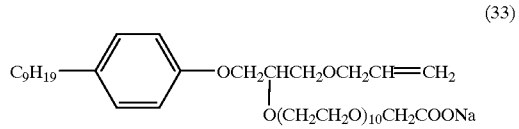

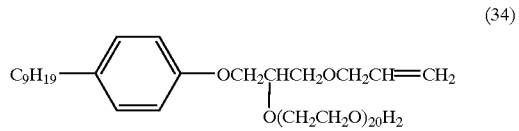

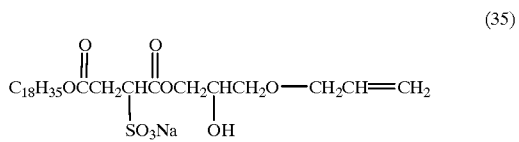

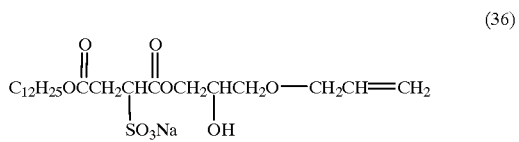

The polymerizable emulsifying agent represented by formula (1) is particularly preferred. Specific preferred examples of the polymerizable emulsifying agent represented by formula (1) include those represented by formulae (37) to (41):

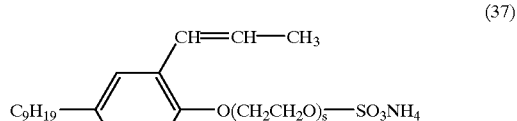

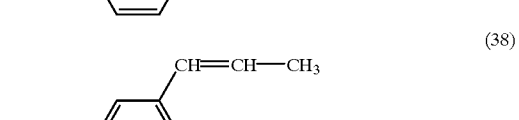

-continued

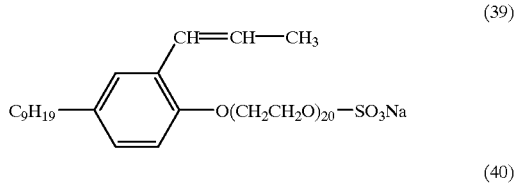

(39)

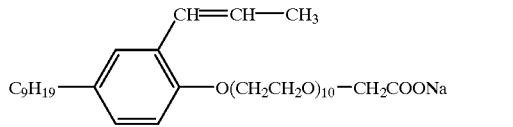

(40)

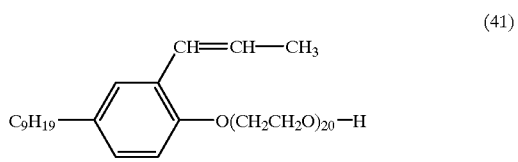

(41)

The percent surface graft coverage required in the present invention can be more easily obtained by adjusting the pH value of the rubber polymer to be used in the graft polymerization to from 6.0 to 8.0. In this pH region, the hydrolysis of the vinyl cyanide monomer can be inhibited, making it possible to reduce the burden of disposal of waste water related to nitrogen compounds and enhance the conversion of polymer.

The resin composition of the present invention may optionally comprise a known oxidation inhibitor, ultraviolet absorbent, lubricant, releasing agent, antistatic agent, fire retardant, and colorant incorporated therein.

EXAMPLE

The present invention will be further described in the following examples. However, the present invention should not be construed as being limited to these examples. The "parts" as used herein are by weight unless otherwise specified.

The measurement methods used in the examples of the present invention are as follows:

Percent Surface Graft Coverage

The rubber-reinforced thermoplastic resin composition was dissolved in a solvent capable of dissolving its sol content (e.g., acetone for an ABS resin). The solution was then subjected to centrifugal separation to withdraw gel content. The gel content was then dispersed in acetone by means of an ultrasonic homogenizer. The dispersion was then added to the base of an epoxy resin adhesive so that it was dispersed therein. Acetone was then removed by vacuum drying. A hardening agent for the epoxy resin adhesive was then added to and mixed with the dispersion. The mixture was then heated so that it was cured. Thus, graft polymer particles dispersed in an epoxy resin were obtained.

The thus obtained epoxy resin containing a rubber polymer particles dispersed therein was dyed with, for example, osmium tetraoxide for an ABS resin, and then cut by an ultramicrotome to prepare an ultrathin specimen. The specimen was observed and photographed under a transmission electron microscope. The thickness of the ultrathin specimen was 60 nm.

In the analysis of the electron micrograph of the rubber polymer particles, an image analyzer IP-1000 (available from Asahi Kasei Kogyo K.K.) was used to measure the percent surface graft coverage. Specifically, an image in which the rubber polymer was distinguished from the vinyl compound component grafted on the surface of the rubber polymer was used. As mentioned above, in FIG. 1, the lengths $a_1$ to $a_n$ and $b_1$ to $b_n$ were measured, to obtain r1 and r2 represented by the following equation:

$$r1 = (a_1 + a_2 + \ldots + a_{n-1} + a_n) + (b_1 + b_2 + \ldots + b_{n-1} + b_n)$$

$$r2 = a_1 + a_2 + \ldots + a_{n-1} + a_n$$

From r1 and r2 the percent surface graft coverage was determined by the following equation (m1'):

Surface graft coverage $(\%) = (r1/r2) \times 100$ (m1')

For the measurement of the percent surface graft coverage in the following examples, only rubber polymer particles having a particle diameter of not less than the particle diameter of the rubber polymer multiplied by 0.9 was selected. The number of the rubber polymer particles thus selected for measurement was 10.

Average Thickness of Graft-polymerized Vinyl Compound

For the measurement of the thickness of the vinyl compound grafted on the surface of the rubber polymer particles, the rubber-reinforced thermoplastic resin composition obtained according to the present invention was dyed with osmium tetraoxide, and then cut by an ultramicrotome to prepare an ultrathin specimen as in the measurement of the percent surface graft coverage. The specimen was then observed and photographed under transmission electron microscope. For the analysis of the electron micrograph of the rubber polymer particles, an image analyzer IP-1000 (available from Asahi Kasei Kogyo K.K.) was used. Specifically, an image in which the rubber polymer was distinguished from the vinyl compound component grafted on the surface of the rubber polymer was used. In FIG. 1, the peripheral length R represented by the following equation corresponding to the surface area of the rubber polymer particles was measured. The area t represented by the following equation corresponding to the volume of the vinyl compound grafted on the surface of the rubber polymer particles was measured.

$$R = (a_1 + a_2 + \ldots + a_{n-1} + a_n) + (b_1 + b_2 + \ldots + b_{n-1} + b_n)$$

$$t = c_1 + c_2 + \ldots + c_{n-1} + c_n$$

From R and t, the average thickness of the vinyl compound is determined by the following equation (m7):

Average thickness of vinyl compound $= (t/R)$ (m7)

The number of the particles measured is 10.

Weight-average Particle Diameter of Rubber Polymer Particles

A drop of a dilute solution of a rubber polymer particles was put on a metal mesh for a transmission electron microscope, and then dyed with a vapor of osmium tetraoxide or ruthenium tetraoxide. The sample thus dyed was then photographed under a transmission electron microscope. The weight-average diameter of particles was determined by the foregoing image analyzer IP-1000. The number of particles measured was 100.

Gel Fraction Content of Rubber Polymer

About 0.2 g of the solid content of the rubber polymer was precisely measured out (sample weight). If the rubber polymer was latex, methanol was added to the latex to cause the solid content to be precipitated. The solid content thus precipitated was then dried at normal temperatures for 24 hours to prepare a sample. The solid content was then dipped in 50 g of toluene solution for 24 hours for swelling. The sample which had thus swollen was then thrown onto a 100-mesh metal net to remove the content soluble in the solvent. The insoluble content remaining on the metal net was dried at a temperature of 130° C. for 1 hour, and then precisely measured out (weight of insoluble content). The gel fraction content was represented by the following equation (m8):

$$\text{Gel fraction content (\%)} = \frac{\text{weight of insoluble content}}{\text{weight of sample}} \times 100 \quad \text{(m8)}$$

Properties of Polybutadiene Latex

The properties of the polybutadiene latex used in the present study are set forth in Table 1.

Method for the Evaluation of Physical Properties

The methods for the evaluation of various physical properties were as follows:

(1) IZOD impact strength

Pellets of the resin composition were molded at a molding temperature of 240° C. and a mold temperature of 45° C. to obtain a test specimen. A notched test specimen (½ in.×¼ in.×⅝ in.) was prepared and subjected to IZOD impact strength test in accordance with ASTM-D256.

(2) High temperature melt flow rate

High temperature melt flow rate was measured in accordance with JIS K7210 (measuring conditions: 280° C., 5 kg load).

(3) Degree of pigmentation after retention

Pellets of the resin composition were molded at a molding temperature of 240° C. and a mold temperature of 45° C. to prepare a reference test specimen. The same pellets as used above were retained at a temperature of 240° C. in a molding machine for 10 minutes, and then molded in the same manner as above to obtain a test specimen. The dimension of the test specimen: 216 mm long×12.6 mm wide×3.2 mm thick. By using SM Color Computer (Model SM-5) (available from Suga Shikenki K.K.), the test specimen was then measured for yellow index ($\Delta YI$) with respect to the reference test specimen. The measuring position was the central part of the specimen.

(4) IZOD impact strength after retention

Pellets of the resin composition were retained at a temperature of 240° C. in a molding machine for 10 minutes, and then molded at a mold temperature of 45° C. to obtain a test specimen. A notched test specimen (½ in.×¼ in.×⅝ in.) was prepared and subjected to IZOD impact strength test in accordance with ASTM-D256.

(5) Gelation starting time

Powder of a graft copolymer rubber (C) and a copolymer (D) described later which had been prepared in examples and comparative examples were mixed and kneaded at a temperature of 240° C. by means of a 30-mm extruder in such a manner that the rubber content was 30%, to prepare pellets. The pellets thus obtained were then extruded at a temperature of 280° C. and a piston falling rate of 1 mm/sec through a capillograph (available from Toyo Seiki K.K.) with an orifice diameter of 1.0 mm. The strand thus extruded was observed for surface condition. The gelation starting time is defined as the time required until particles appear on the surface of the strand.

Example 1

Into a 10-l reaction vessel were charged 40 parts (solid content) of polybutadiene latex (J-1) set forth in Table 1, 1 part of an emulsifying agent represented by formula (38), and 100 parts of ion-exchanged water. The gas phase was replaced by nitrogen. The initial solution obtained was then heated to a temperature of 70° C. To the initial solution were then continuously added an aqueous solution (A) having the following composition and a monomer mixture (B) having the following composition over 5 hours to conduct polymerization. After the completion of addition, the reaction system was kept at the same temperature for 1 hour to complete the reaction.

The composition of the aqueous solution (A) was as follows:

| Ferrous sulfate | 0.005 part |
|---|---|
| Sodium formaldehyde sulfoxilate (SFS) | 0.1 part |
| Disodium ethylenediaminetetraacetate (EDTA) | 0.05 part |
| Ion-exchanged water | 50 parts |

The composition of the monomer mixture (B) was as follows:

| Acrylonitrile | 18 parts |
|---|---|
| Styrene | 42 parts |
| t-Dodecylmercaptan (t-DM) | 0.7 part |
| Cumene hydroperoxide (CHP) | 0.1 part |

To the ABS latex thus obtained was then added an oxidation inhibitor. Aluminum sulfate was then added to the latex in an amount of 1.0 part per 100 parts of the polymer so that the latex was solidified. The latex was thoroughly desalted, rinsed, and then dried to obtain graft polymer powder (C) (the polymerization time set forth in Table 2 indicates the addition time of the monomer B).

The graft polymer powder (C) was then mixed with a copolymer (D) having an intrinsic viscosity of 0.47 in 30° C. methyl ethyl ketone obtained by the solution polymerization of a monomer mixture consisting of 70% of styrene and 30% of acrylonitrile. The mixture was then kneaded at a temperature of 240° C. by means of a 30-mm extruder in such a manner that the rubber content was 20% so that it was pelletized. During this process, 1.0 part of ethylene bisstearylamide (EBS) was added to the mixture. The charged composition, monomer mixture, polymerization time and extrusion conditions were as set forth in Table 2.

Examples 2 to 5

Pellets were obtained in the same manner as in Example 1 except that J-2 to J-5 set forth in Table 1 were used as rubber and the charged composition, monomer mixture, polymerization time and extrusion conditions were as set forth in Table 2.

Example 6

Pellets were obtained in the same manner as in Example 1 except that 33 parts (solid content) of a polybutadiene latex (J-1), 7 parts of a polybutadiene latex (H-1) and 100 parts of ion-exchanged water were charged into a 10-l reaction vessel.

Example 7

Pellets were obtained in the same manner as in Example 6 except that the polybutadiene latex (H-1) was replaced by a polybutadiene latex (H-2).

The resulting pellets for Examples 1 to 7 were measured for their properties. The results obtained are shown in Table 3.

TABLE 1

| | Kind of rubber | | | | | | |
|---|---|---|---|---|---|---|---|
| | J-1 | J-2 | J-3 | J-4 | H-5 | H-1 | H-2 |
| Weight average particle diameter (nm) | 310 | 220 | 405 | 305 | 418 | 140 | 620 |
| Gel fraction (%) | 71 | 63 | 62 | 88 | 87 | 62 | 75 |

TABLE 2

| | Example | | | | | | |
|---|---|---|---|---|---|---|---|
| | 1 | 2 | 3 | 4 | 5 | 6 | 7 |
| Graft Polymer C | | | | | | | |
| Initial Solution | | | | | | | |
| Kind of rubber | J-1 | J-2 | J-3 | J-4 | J-5 | J-1/H-1 | J-1/H-2 |
| Polybutadiene | 40 | 40 | 40 | 40 | 40 | 33/7 | 33/7 |
| Ion-exchanged water | 100 | 100 | 100 | 100 | 100 | 100 | 100 |
| Emulsifying agent | 1.0 | 1.0 | 1.0 | 1.0 | 1.0 | 1.0 | 1.0 |
| Kind of emulsifying agent | (38) | (38) | (38) | (38) | (38) | (38) | (38) |
| Aqueous Solution A | | | | | | | |
| Ferrous sulfate | 0.005 | 0.005 | 0.005 | 0.005 | 0.005 | 0.005 | 0.005 |
| SFS | 0.1 | 0.1 | 0.1 | 0.1 | 0.1 | 0.1 | 0.1 |
| EDTA | 0.05 | 0.05 | 0.05 | 0.05 | 0.05 | 0.05 | 0.05 |
| Ion-exchanged water | 50 | 50 | 50 | 50 | 50 | 50 | 50 |
| Monomer Mixture B | | | | | | | |
| Acrylonitrile | 18 | 18 | 18 | 18 | 18 | 18 | 18 |
| Styrene | 42 | 42 | 42 | 42 | 42 | 42 | 42 |
| t-DM | 0.7 | 0.7 | 0.7 | 0.7 | 0.7 | 0.7 | 0.7 |
| CHP | 0.1 | 0.1 | 0.1 | 0.1 | 0.1 | 0.1 | 0.1 |
| Polymerization time | 5 | 5 | 5 | 5 | 5 | 5 | 5 |
| Composition to be extruded | | | | | | | |
| Amount of C | 50 | 50 | 50 | 50 | 50 | 50 | 50 |
| Amount of D | 50 | 50 | 50 | 50 | 50 | 50 | 50 |
| Amount of EBS | 1.0 | 1.0 | 1.0 | 1.0 | 1.0 | 1.0 | 1.0 |
| Amount of rubber | 20 | 20 | 20 | 20 | 20 | 20 | 20 |

TABLE 3

| | Example | | | | | | |
|---|---|---|---|---|---|---|---|
| | 1 | 2 | 3 | 4 | 5 | 6 | 7 |
| Surface graft coverage (%) | 100 | 100 | 100 | 100 | 100 | 100 | 100 |
| Average graft thickness (nm) | 10.8 | 9.6 | 12.0 | 10.5 | 11.4 | 11.5 | 11.4 |
| Izod impact strength (kgcm/cm) | 33 | 32 | 34 | 33 | 34 | 34 | 33 |
| High temperature melt flow rate (g/10 min) | 111 | 110 | 105 | 108 | 103 | 105 | 107 |
| Degree of coloring during retention | 1.9 | 1.9 | 1.8 | 1.8 | 1.8 | 1.9 | 1.9 |
| Izod impact strength during retention (kgcm/cm) | 29 | 32 | 34 | 33 | 34 | 34 | 33 |
| Gelation starting time (min) | 60< | 60< | 60< | 60< | 60< | 60< | 60< |

Examples 8 to 19

Pellets were obtained in the same manner as in Example 1 except that the charged compositions set forth in Tables 4 and 6 were used.

Example 20

Pellets were obtained in the same manner as in Example 1 except that the emulsifying agent and polymerization time were altered as set forth in Table 6. RK in Table 6 represents potassium rhodinate (hereinafter the same).

Example 21

Pellets were obtained by blending 60 parts by weight of the rubber-reinforced thermoplastic resin composition obtained in Example 1 with 40 parts by weight of a polymethyl methacrylate having a reduced viscosity of 6. The measurement of reduced viscosity was conducted in 0.1% chloroform at a temperature of 25° C.

The charged composition, monomer mixture, polymerization time and extrusion conditions for Examples 8 to 21 were as set forth in Tables 4 and 6.

The resulting pellets for Examples 8 to 21 were measured for their properties. The results obtained are shown in Tables 5 and 7.

TABLE 4

|  | Example | | | | | | |
|---|---|---|---|---|---|---|---|
|  | 8 | 9 | 10 | 11 | 12 | 13 | 14 |
| Graft Polymer C | | | | | | | |
| Initial Solution | | | | | | | |
| Kind of rubber | J-1 | J-1 | J-1 | J-1 | J-1 | J-1 | J-1 |
| Polybutadiene | 40 | 40 | 40 | 40 | 40 | 40 | 40 |
| Ion-exchanged water | 100 | 100 | 100 | 100 | 100 | 100 | 100 |
| Emulsifying agent | 1.0 | 1.0 | 1.0 | 1.0 | 1.0 | 1.0 | 1.0 |
| Kind of emulsifying agent | (38) | (38) | (37) | (39) | (40) | (41) | (31) |
| Aqueous Solution A | | | | | | | |
| Ferrous sulfate | 0.01 | 0.005 | 0.005 | 0.005 | 0.005 | 0.005 | 0.005 |
| SFS | 0.2 | 0.1 | 0.1 | 0.1 | 0.1 | 0.1 | 0.1 |
| EDTA | 0.1 | 0.05 | 0.05 | 0.05 | 0.05 | 0.05 | 0.05 |
| Ion-exchanged water | 50 | 50 | 50 | 50 | 50 | 50 | 50 |
| Monomer Mixture B | | | | | | | |
| Acrylonitrile | 18 | 9 | 18 | 18 | 18 | 18 | 18 |
| Styrene | 42 | 21 | 42 | 42 | 42 | 42 | 42 |
| t-DM | 0.7 | 0.5 | 0.7 | 0.7 | 0.7 | 0.7 | 0.7 |
| CHP | 0.2 | 0.2 | 0.1 | 0.1 | 0.1 | 0.1 | 0.1 |
| Polymerization time | 5 | 5 | 5 | 5 | 5 | 5 | 5 |
| Composition to be extruded | | | | | | | |
| Amount of C | 50 | 33 | 50 | 50 | 50 | 50 | 50 |
| Amount of D | 50 | 67 | 50 | 50 | 50 | 50 | 50 |
| Amount of EBS | 1.0 | 1.0 | 1.0 | 1.0 | 1.0 | 1.0 | 1.0 |
| Amount of rubber | 20 | 20 | 20 | 20 | 20 | 20 | 20 |

TABLE 5

|  | Example | | | | | | |
|---|---|---|---|---|---|---|---|
|  | 8 | 9 | 10 | 11 | 12 | 13 | 14 |
| Surface graft coverage (%) | 100 | 100 | 100 | 100 | 100 | 100 | 100 |
| Average graft thickness (nm) | 14.5 | 7.8 | 9.8 | 10.6 | 12.1 | 10.4 | 9.8 |
| Izod impact strength (kgcm/cm) | 38 | 30 | 31 | 33 | 35 | 35 | 33 |
| High temperature melt flow rate (g/10 min) | 103 | 85 | 105 | 110 | 105 | 106 | 110 |
| Degree of coloring | 1.9 | 2.2 | 1.9 | 1.8 | 1.8 | 1.9 | 1.9 |
| Izod impact strength during retention (kgcm/cm) | 31 | 25 | 28 | 29 | 30 | 30 | 32 |
| Gelation starting time (min) | 60< | 60< | 60< | 60< | 60< | 60< | 60< |

TABLE 6

|  | Example | | | | | | |
|---|---|---|---|---|---|---|---|
|  | 15 | 16 | 17 | 18 | 19 | 20 | 21 |
| Graft Polymer C | | | | | | | |
| Initial Solution | | | | | | | |
| Kind of rubber | J-1 | J-1 | J-1 | J-1 | J-1 | J-1 | J-1 |
| Polybutadiene | 40 | 40 | 40 | 40 | 40 | 40 | 40 |
| Ion-exchanged water | 100 | 100 | 100 | 100 | 100 | 100 | 100 |
| Emulsifying agent | 1.0 | 1.0 | 1.0 | 1.0 | 1.0 | 1.0 | 1.0 |
| Kind of emulsifying agent | (33) | (34) | (35) | (12) | (16) | RK | (38) |
| Aqueous Solution A | | | | | | | |
| Ferrous sulfate | 0.005 | 0.005 | 0.005 | 0.005 | 0.005 | 0.005 | 0.005 |
| SFS | 0.1 | 0.1 | 0.1 | 0.1 | 0.1 | 0.1 | 0.1 |
| EDTA | 0.05 | 0.05 | 0.05 | 0.05 | 0.05 | 0.05 | 0.05 |
| Ion-exchanged water | 50 | 50 | 50 | 50 | 50 | 50 | 50 |

TABLE 6-continued

|  | Example | | | | | | |
|---|---|---|---|---|---|---|---|
|  | 15 | 16 | 17 | 18 | 19 | 20 | 21 |
| Monomer Mixture B |  |  |  |  |  |  |  |
| Acrylonitrile | 18 | 18 | 18 | 18 | 18 | 18 | 18 |
| Styrene | 42 | 42 | 42 | 42 | 42 | 42 | 42 |
| t-DM | 0.7 | 0.7 | 0.7 | 0.7 | 0.7 | 0.7 | 0.7 |
| CHP | 0.1 | 0.1 | 0.1 | 0.1 | 0.1 | 0.1 | 0.1 |
| Polymerization time | 5 | 5 | 5 | 5 | 5 | 20 | 5 |
| Composition to be extruded |  |  |  |  |  |  |  |
| Amount of C | 50 | 33 | 50 | 50 | 50 | 50 | 50 |
| Amount of D | 50 | 50 | 50 | 50 | 50 | 50 | 50 |
| Amount of EBS | 1.0 | 1.0 | 1.0 | 1.0 | 1.0 | 1.0 | 1.0 |
| Amount of rubber | 20 | 20 | 20 | 20 | 20 | 20 | 20 |

TABLE 7

|  | Example | | | | | | |
|---|---|---|---|---|---|---|---|
|  | 15 | 17 | 17 | 18 | 19 | 20 | 21 |
| Surface graft coverage (%) | 100 | 100 | 100 | 100 | 100 | 100 | 100 |
| Average graft thickness (nm) | 12.7 | 10.2 | 11.7 | 11.1 | 11.3 | 11.6 | 10.8 |
| Izod impact strength (kgcm/cm) | 34 | 33 | 35 | 35 | 34 | 26 | 19 |
| High temperature melt flow rate (g/10 min) | 101 | 100 | 101 | 101 | 101 | 70 | 141 |
| Degree of coloring during retention | 1.8 | 1.8 | 1.8 | 1.9 | 1.9 | 1.9 | 1.0 |
| Izod impact strength during retention (kgcm/cm) | 32 | 31 | 29 | 30 | 31 | 22 | 16 |
| Gelation starting time (min) | 60< | 60< | 60< | 60< | 60< | 60< | 60< |

Comparative Example 1

Into a 10-l reaction vessel were charged 40 parts (solid content) of the polybutadiene latex (J-1), 1.0 part of potassium rhodinate, and 100 parts of ion-exchanged water. The gas phase was replaced by nitrogen. The initial solution obtained was then heated to a temperature of 70° C. To the initial solution were then continuously added an aqueous solution (A) having the following composition and a monomer mixture (B) having the following composition over 5 hours. Thus, reaction was effected under ordinary conditions of the amount of emulsifying agent, the amount of ferrous sulfate as a catalyst, and the polymerization time. After the completion of addition, the reaction system was kept at the same temperature for 1 hour to complete the reaction.

The compositions of the aqueous solution (A) and the monomer (B) were the same as in Example 1:

The ABS latex thus obtained was then processed in the same manner as in Example 1 to obtain pellets.

Comparative Example 2

Into a 10-l reaction vessel were charged 40 parts (solid content) of the polybutadiene latex (J-1) and 100 parts of ion-exchanged water. The gas phase was replaced by nitrogen. The initial solution obtained was then heated to a temperature of 70° C. An aqueous solution (A) having the following composition and a monomer mixture (B) having the following composition were then charged into the reaction vessel at once. The reaction mixture was allowed to undergo polymerization at a temperature of 70° C. for 2 hours.

The composition of the aqueous solution (A) was as follows:

| Ferrous sulfate | 0.01 part |
|---|---|
| Sodium formaldehyde sulfoxilate (SFS) | 0.3 part |
| Disodium ethylenediaminetetraacetate (EDTA) | 0.1 part |
| Ion-exchanged water | 50 parts |

The composition of the monomer mixture (B) was as follows:

| Acrylonitrile | 18 parts |
|---|---|
| Styrene | 42 parts |
| t-Dodecylmercaptan (t-DM) | 0.7 part |
| Cumene hydroperoxide (CHP) | 0.3 part |

The ABS latex thus obtained was then processed in the same manner as in Example 1 to obtain pellets.

Comparative Example 3

Into a 10-l reaction vessel were charged 20 parts (solid content) of the polybutadiene latex (J-1) and 100 parts of ion-exchanged water. The gas phase was replaced by nitrogen. The initial solution obtained was then heated to a temperature of 70° C. To the initial solution were then continuously added an aqueous solution (A) having the following composition and a monomer mixture (B) having the following composition over 5 hours to conduct polymerization under the conditions that the rubber concentration during polymerization was low. After the completion of addition, the reaction system was kept at the same temperature for 1 hour to complete the reaction.

The composition of the aqueous solution (A) was as follows:

| Ferrous sulfate | 0.01 part |
|---|---|
| Sodium formaldehyde sulfoxilate (SFS) | 0.2 part |
| Disodium ethylenediaminetetraacetate (EDTA) | 0.1 part |
| Ion-exchanged water | 50 parts |

The composition of the monomer mixture (B) was as follows:

| Acrylonitrile | 24 parts |
|---|---|
| Styrene | 56 parts |
| t-Dodecylmercaptan (t-DM) | 1.2 parts |
| Cumene hydroperoxide (CHP) | 0.4 part |

To the ABS latex thus obtained was then added an oxidation inhibitor. Aluminum sulfate was then added to the latex in an amount of 1.0 part per 100 parts of the polymer so that the latex was solidified. The latex was thoroughly desalted, rinsed, and then dried to obtain a graft polymer powder (C).

The graft polymer powder (C) was then kneaded at a temperature of 240° C. by means of a 30-mm extruder it was pelletized. During this process, 1.0 part of ethylene bis-stearylamide (EBS) was added to the mixture.

Comparative Example 4

Into a 10-l reaction vessel were charged 60 parts (solid content) of the polybutadiene latex (J-1), 1.0 part of potassium rhodinate, and 100 parts of ion-exchanged water. The gas phase was replaced by nitrogen. The initial solution obtained was then heated to a temperature of 70° C. To the initial solution were then continuously added an aqueous solution (A) having the following composition and a monomer mixture (B) having the following composition over 3 hours to conduct polymerization under the conditions that the rubber concentration during polymerization was high. After the completion of addition, the reaction system was kept at the same temperature for 1 hour to complete the reaction.

The composition of the aqueous solution (A) was the same as in Example 1.

The composition of the monomer mixture (B) was as follows:

| Acrylonitrile | 12 parts |
|---|---|
| Styrene | 28 parts |
| t-Dodecylmercaptan (t-DM) | 0.5 part |
| Cumene hydroperoxide (CHP) | 0.1 part |

The ABS latex thus obtained was then processed in the same manner as in Example 1 to obtain pellets.

Comparative Example 5

Pellets were obtained in the same manner as in Comparative Example 1 except that a polybutadiene latex (J-4) was used instead of the polybutadiene latex (J-1).

The charged composition, monomer mixture, polymerization time and extrusion conditions for Comparative Examples 1 to 5 were as set forth in Table 8.

The resulting pellets for Comparative Examples 1 to 5 were measured for their properties. The results obtained are shown in Table 9.

TABLE 8

| | Comparative Example | | | | |
|---|---|---|---|---|---|
| | 1 | 2 | 3 | 4 | 5 |
| Graft Polymer C | | | | | |
| Initial Solution | | | | | |
| Kind of rubber | J-1 | J-1 | J-1 | J-1 | J-4 |
| Polybutadiene | 40 | 40 | 20 | 60 | 40 |
| Ion-exchanged water | 100 | 100 | 100 | 100 | 100 |
| Emulsifying agent | 1.0 | 1.5 | 1.0 | 1.0 | 1.0 |
| Kind of emulsifying agent | RK | RK | RK | RK | RK |
| Aqueous Solution A | | | | | |
| Ferrous sulfate | 0.005 | 0.01 | 0.01 | 0.005 | 0.005 |
| SFS | 0.1 | 0.3 | 0.2 | 0.1 | 0.1 |
| EDTA | 0.05 | 0.1 | 0.1 | 0.05 | 0.05 |
| Ion-exchanged water | 50 | 50 | 50 | 50 | 50 |
| Monomer Mixture B | | | | | |
| Acrylonitrile | 18 | 18 | 24 | 12 | 18 |
| Styrene | 42 | 42 | 56 | 28 | 42 |
| t-DM | 0.7 | 0.7 | 1.2 | 0.5 | 0.7 |
| CHP | 0.1 | 0.3 | 0.4 | 0.1 | 0.1 |
| Polymerization time | 5 | 2 | 5 | 3 | 5 |
| Composition to be extruded | | | | | |
| Amount of C | 50 | 50 | 50 | 100 | 33 |
| Amount of D | 50 | 50 | 50 | 0 | 67 |
| Amount of EBS | 1.0 | 1.0 | 1.0 | 1.0 | 1.0 |
| Amount of rubber | 20 | 20 | 20 | 20. | 20 |

TABLE 9

| | Comparative Example | | | | |
|---|---|---|---|---|---|
| | 1 | 2 | 3 | 4 | 5 |
| Surface graft coverage (%) | 33 | 41 | 97 | 81 | 44 |
| Average graft thickness (nm) | 13.3 | 9.6 | 26 | 4 | 10.7 |
| Izod impact strength (kgcm/cm) | 8 | 10 | 19 | 8 | 19 |
| High temperature melt flow rate (g/10 min) | 32 | 34 | 44 | 41 | 48 |
| Degree of coloring during retention | 12.3 | 13.2 | 2.5 | 10.5 | 12.2 |
| Izod impact strength during retention (kgcm/cm) | 6 | 8 | 12 | 9 | 13 |
| Gelation starting time (min) | 3 | 4 | 60< | 5 | 3 |

The results in Tables 3, 5, 7, and 9 show the following results.

In Example 1, the percent surface graft coverage is as high as 100%. Therefore, the resulting rubber-reinforced thermoplastic resin composition exhibits a high impact resistance and excellent fluidity at high temperatures, and impact resistance, resistance-to coloration and resistance to gelation during retention although the thickness of the graft layer is as low as 9.2 nm. Similarly, the rubber-reinforced thermoplastic resin compositions of the present invention (Examples 2 to 20) fall within the specified range of the percent surface graft coverage and the thickness of the graft layer of vinyl compound and all exhibit a high impact resistance and excellent fluidity during high-temperature processing (high temperature melt flow rate), impact resistance during high-temperature retention (IZOD during retention), resistance to coloration during high-temperature retention (degree of coloring during retention) and resistance to gelation during high-temperature retention (gelation starting time).

On the other hand, the rubber-reinforced thermoplastic resin composition which deviate from the specified range of the percent surface graft coverage of rubber polymer particles by vinyl compound exhibit a poor impact resistance, fluidity during high-temperature processing and resistance to coloration during high-temperature retention (Comparative Examples 1 to 3). Further, the rubber-reinforced thermoplastic resin compositions which deviate from the specified range of the thickness of the graft layer of vinyl compound exhibit a poor impact resistance (Comparative Example 4) or a poor resistance to gelation (Comparative Example 5).

What is claimed is:

1. A rubber-reinforced thermoplastic resin composition comprising a thermoplastic resin matrix having dispersed therein particles of a graft polymer, said particles of a graft polymer comprising particles of a rubber polymer having emulsion-graft-polymerized to the surface thereof two or more kinds of vinyl compounds graft-copolymerizable with said rubber polymer, wherein the surface graft coverage of said vinyl compounds graft-polymerized to the surface of said particles of a rubber polymer as determined by equation (m1) is 80% or more and the average thickness of said vinyl compounds graft-polymerized to the surface of said particles of a rubber polymer is from 5 to 25 nm:

Surface graft coverage (%)=($s2/s1$)×100      (m1)

wherein s1 represents the surface area of said particles of a rubber polymer; and s2 represents the surface area of said vinyl compound graft-polymerized to the surface of said particles of a rubber polymer so as to cover the surface of said particles of a rubber polymer.

2. A rubber-reinforced thermoplastic resin composition as claimed in claim 1, wherein said particles of a rubber polymer has a gel fraction content X % and a weight-average particle diameter Y nm meeting the conditions by equations (m2) and (m3):

$40 \leq X \leq 60$, and $150 \leq Y \leq 600$      (m2)

$60 < X \leq 100$, and $2.5X \leq Y \leq 600$      (m3).

3. A rubber-reinforced thermoplastic resin composition as claimed in claim 1, wherein said vinyl compound comprises an aromatic vinyl compound and a vinyl cyanide compound.

4. A rubber-reinforced thermoplastic resin composition as claimed in claim 1, wherein at least one of emulsifying agents used for emulsion graft polymerization of said vinyl compounds is an emulsifying agent having a radically polymerizable double bond in its molecule.

5. A rubber-reinforced thermoplastic resin composition as claimed in claim 4, wherein said emulsifying agent is represented by formula (1):

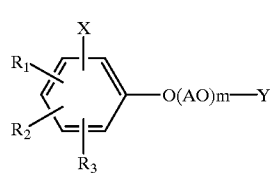

(1)

wherein

X represents an allyl group, a methylallyl group, an acryloyl group, a methacryloyl group, a vinyl group, a 1-propenyl group, or an isopropenyl group;

Y represents a hydrogen atom, a sulfate group represented by —$SO_3M$ (in which M represents a hydrogen atom, an alkaline earth, an alkaline earth metal, an ammonium, or a hydroxylalkylammonium having from 1 to 4 carbon atoms), a carboxylate group represented by —$CH_2COOM$ (in which M represents a hydrogen atom, alkaline earth, alkaline earth metal, ammonium, or a hydroxylalkylammonium having from 1 to 4 carbon atoms), or a monoester phosphate group represented by formula (1'):

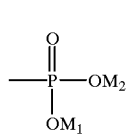

(1')

wherein $M_1$ and $M_2$ may be the same or different and each represent a hydrogen atom, an alkaline metal, an alkaline earth metal, a ammonium, or a hydroxyalkylammonium having from 1 to 4 carbon atoms;

$R_1$ represents a alkyl group having from 1 to 18 carbon atoms, an alkenyl group, or an aralkyl group;

$R_2$ represents a hydrogen atom, an alkyl group having from 1 to 18 carbon atoms, an alkenyl group, or an aralkyl group;

$R_3$ represents a hydrogen atom or a propenyl group;

A represents a alkylene group having from 2 to 4 carbon atoms or an alkylene group having from 2 to 4 carbon atoms and having a substituent; and m represents an integer of from 1 to 200.

6. A rubber-reinforced thermoplastic resin composition as claimed in claim 4, wherein said emulsifying agent is represented by formula (2):

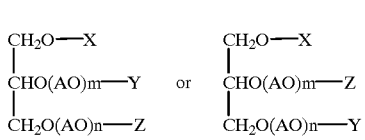

(2)

wherein

X represents an allyl group, a methylallyl group, an acryloyl group, a methacryloyl group, a vinyl group, a 1-propenyl group, or an isopropenyl group;

Y represents a hydrogen atom, a sulfate group represented by —$SO_3M$ (in which M represents a hydrogen atom, an alkaline earth, an alkaline earth metal, an ammonium, or a hydroxylalkylammonium having from 1 to 4 carbon atoms), a carboxylate represented by —$CH_2COOM$ (in which M represents a hydrogen atom, an alkaline earth, an alkaline earth metal, an ammonium, or a hydroxylalkylammonium having from 1 to 4 carbon atoms), a monoester phosphate group represented by formula (1'), or a group represented by formula (1"):

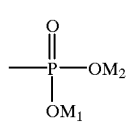

(1')

wherein $M_1$ and $M_2$ may be the same or different and each represent a hydrogen atom, an alkaline metal, an alkaline earth metal, a ammonium, or a hydroxyalkylammonium having from 1 to 4 carbon atoms,

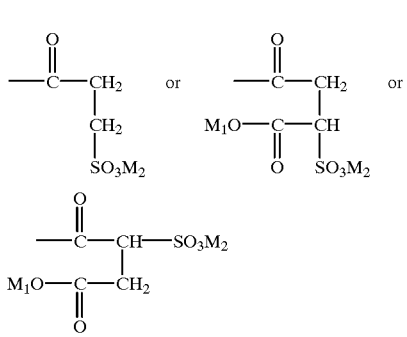

(1″)

wherein $M_1$ represents a hydrogen atom, an alkaline metal, an alkaline earth metal, an ammonium, a hydroxyalkylammonium having from 1 to 4 carbon atoms, or an alkyl group having from 8 to 30 carbon atoms which may contain an alkylene oxide group having from 2 to 4 carbon atoms; and $M_2$ represents a hydrogen atom, an alkaline metal, an alkaline earth metal, an ammonium, or a hydroxyalkylammonium having from 1 to 4 carbon atoms;

Z represents a alkyl group having from 8 to 30 carbon atoms, a substituted alkyl group, an alkenyl group, a substituted alkenyl group, an alkylaryl group, a substituted alkylaryl group, an aralkyl aryl group, a substituted aralkyl aryl group, an acyl group, or a substituted acyl group;

A represents a alkylene group having from 2 to 4 carbon atoms or a substituted alkylene group;

m represents an integer of from 0 to 100; and n represents an integer of from 0 to 50.

7. A rubber-reinforced thermoplastic resin composition as claimed in claim 4, wherein said emulsifying agent is represented by formula (3):

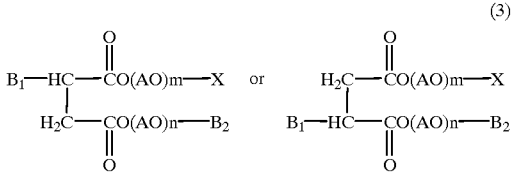

(3)

wherein

X represents an allyl group, a methylallyl group, an acryloyl group, a methacryloyl group, a vinyl group, a 1-propenyl group, or an isopropenyl group;

$B_1$ and $B_2$ are different from each other and each represent Y or Z, wherein Y represents M or —$SO_3M$ in which M represents a hydrogen atom, an alkaline metal, an alkaline earth metal, an ammonium, or a hydroxyalkylammonium having from 1 to 4 carbon atoms, and Z represents a alkyl group having from 8 to 30 carbon atoms or an alkenyl group;

A represents a alkylene group having from 2 to 4 carbon atoms or an alkylene group having substituents; and m and n may be the same or different and each represent an integer of from 0 to 50.

8. A rubber-reinforced thermoplastic resin composition as claimed in claim 4, wherein said emulsifying agent is represented by formula (4):

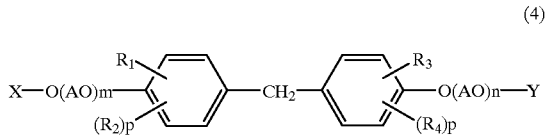

(4)

wherein

X represents an allyl group, a methylallyl group, an acryloyl group, a methacryloyl group, a vinyl group, a 1-propenyl group, or an isopropenyl group;

Y represents a hydrogen atom, a sulfate group represented by —$SO_3M$ (in which M represents a hydrogen atom, an alkaline earth, an alkaline earth metal, a ammonium or a hydroxylalkylammonium having from 1 to 4 carbon atoms), or a carboxylate group represented by —$CH_2COOM$ (in which M represents a hydrogen atom, an alkaline earth, an alkaline earth metal, an ammonium, or a hydroxylalkylammonium having from 1 to 4 carbon atoms);

$R_1$ and $R_3$ may be the same or different and each represent a hydrogen atom, an alkyl group having from 1 to 25 carbon atoms;

$R_2$ and $R_4$ may be the same or different and each represent an alkyl group having from 1 to 25 carbon atoms, a benzyl group, or a styryl group;

p represents an integer of from 0 to 2;

A represents an alkylene group having from 2 to 4 carbon atoms or an alkylene group having a substituent; and n and m may be the same or different and each represent an integer of from 0 to 50.

9. A resin composition comprising from 30 to 99% by weight, based on the total amount of said resin composition, of a rubber-reinforced thermoplastic resin composition as claimed in claim 1 and from 1 to 70% by weight, based on the total amount of said resin composition, of at least one thermoplastic resin selected from the group consisting of polycarbonate, polyphenylene oxide, acryl resin, thermoplastic polyurethane, polyester, and polyamide.

10. A process for producing a rubber-reinforced thermoplastic resin composition as claimed in claim 1, said process comprising graft-polymerizing particles of a rubber polymer with two or more kinds of vinyl compounds graft-polymerizable with said rubber polymer, under such conditions that the pH value of a graft polymerization system of said graft polymerization is from 6.0 to 8.0.

11. A rubber-reinforced thermoplastic resin composition as claimed in claim 2, wherein at least one of emulsifying agents used for emulsion graft polymerization of said vinyl compounds is an emulsifying agent having a radically polymerizable double bond in its molecule.

12. A resin composition comprising from 30 to 99% by weight, based on the total amount of said resin composition, of a rubber-reinforced thermoplastic resin composition as claimed in claim 2 and from 1 to 70% by weight, based on the total amount of said resin composition, of at least one thermoplastic resin selected from the group consisting of polycarbonate, polyphenylene oxide, acryl resin, thermoplastic polyurethane, polyester, and polyamide.

* * * * *